Oct. 26, 1965 D. GABOR 3,214,645

TRANSDUCER POLES

Filed May 9, 1960 2 Sheets-Sheet 1

INVENTOR.
DENNIS GABOR

BY Frank A. Steldt

ATTORNEY

TRANSDUCER POLES

Filed May 9, 1960 2 Sheets-Sheet 2

INVENTOR.
DENNIS GABOR

United States Patent Office 3,214,645

Patented Oct. 26, 1965

3,214,645
TRANSDUCER POLES

Dennis Gabor, London, England, assignor to Minnesota Mining and Manufacturing Company, St. Paul, Minn., a corporation of Delaware Filed May 9, 1960, Ser. No. 27,558
1 Claim. (Cl. 317—158)

This invention relates to transducer pole-piece assemblies for use in transducers for magnetic recording, playback and erasures of information on strip-form or sheet form magnetic record media and to processes adapted to the manufacture of such transducers.

The production of magnetic transducers for recording and playback information on magnetic record media is well known. Such heads may be relatively simple and may have a wide dimensional tolerance when the resolution required is of a low order. As the demand for higher resolution and slower traverse speed of the recording medium increases, the dimensional tolerances become increasingly smaller, until the gaps employed, for example, are required to be of the order of 10 microns or smaller. When recording or playback of stereophonic sound records at high fidelity is required, the gap width must be extremely small while the alignment of the gaps of the two heads simultaneously employed must be made with great precision.

It is an object of this invention to provide transducers for the recording, playback and erasure of information on magnetic tapes. A further object is to provide readily fabricated, precision pole piece assemblies for magnetic heads. A still further object is to provide stereophonic recording heads with predetermined gap alignment and gap widths of small dimensions. Yet another object is to provide a method for the fabrication of inline stereophonic heads of high precision by simple and inexpensive procedures. Other objects will become apparent from the disclosures hereinafter made.

Broadly speaking, this invention contemplates the production of transducer heads for the recording, playback and erasure of information recorded on magnetic tape by techniques utilizing the inlaying of magnetic materials on non-magnetic sheet substrates. It is believed that the art of magnetic recording is well enough advanced that it will be understood that the recorded information may be of any sort, for example, music, data, spoken words, television signals or any other form of information which can be converted by electronic circuitry to a variable magnetic field and impressed as magnetic impulses on a tape or other supporting medium coated with magnetizable material. So far as is known, although magnetic heads have heretofore been made which have pole pieces made from several laminae of magnetic material, such as iron, suitably fastened together, the laminae have always heretofore been perpendicular to the plane of the moving tape and parallel to the direction of movement of the tape, and the pole pieces have been relatively massive since machining was necessary to produce the final form and dimension desired. It has now been found that a very much simplified procedure of manufacture of transducers is possible by making a monolaminar head after the fashion of damascening or marquetry. The gap of such a head is in the normal position at right angles to the moving tape, but the pole pieces are relatively thin single laminae which, at least at the gap, are parallel to the plane of the moving tape, and which are inlaid into a template or matrix of predetermined form which positions the pole-piece to predetermined location and gap dimensions and alignment. Such a head might be referred to as a sheet metal stereophonic head, or as a marquetry pole head.

The construction and operation of the transducer heads of the invention will be more readily understood by reference to the accompanying drawings and description thereof, in which.

Figure 1:
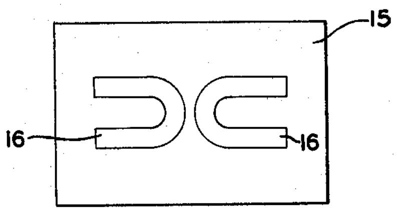
FIGURE 1 shows a plan view of the matrix sheet.

Referring again to the drawings, FIGURE 1 shows a matrix sheet 15 according to the invention, containing cut out portions 16 conforming to the shape of the pole pieces which are to be employed. The matrix sheet is made from a non-magnetic material, such as Inconel or the like. The cut out portions are made to fit the pole pieces exactly over a sufficient portion of their dimensions to insure that the location of the gap, and the alignment thereof with the eventual magnetic record medium and/or any other gap which is to be used in the same head, are exactly those previously established.

Figure 2:
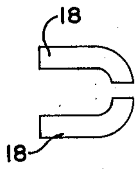
FIGURE 2 shows a plan view of pole pieces adapted to fit and be inlaid into the matrix sheet.

FIGURE 2 shows a pair of pole pieces 18 of complementary shape to the cut-out openings 16, and adapted to fit into the cut out portion of matrix sheet 15. The pole pieces are made of a magnetic metal, such as mumetal (18% Fe, 75% Ni, 2% Cr, 5% Cu) or the like. The thickness of the pole pieces may be the same as that of the matrix sheet, or they may be somewhat thicker, if desired. Most usefully, the materials chosen for construction of the pole piece assembly are selected to have approximately the same coefficient of thermal expansion.

Figure 3:
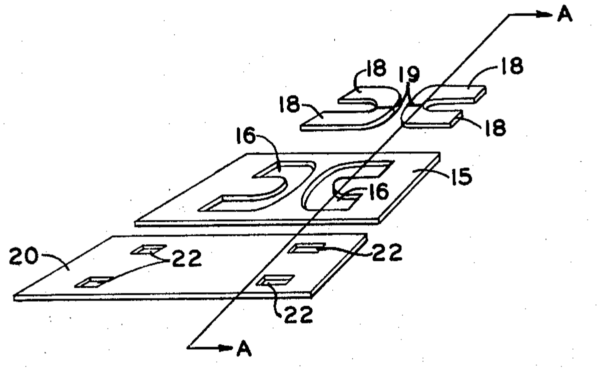
FIGURE 3 is an exploded view of a base sheet, matrix sheet and pole pieces in order of assembly.

FIGURE 3 shows an exploded view in perspective of all the components of a pole piece assembly according to the invention, and in relationship to the position they occupy when assembled. Base sheet 20 is shown provided with apertures 22, which provide for access to the magnetic pole pieces after assembly, from the base sheet side. Base sheet 20 is made of a nonmagnetic material, preferably of the same material as matrix sheet 15. Pole pieces 18, when assembled, form magnetic gap 19.

The matrix sheet 15 is first temporarily attached to the base plate 20 and then the pole pieces 18 are fitted into the cut out portion. The whole assembly is then bonded together, as by welding, to form a two-layer laminate.

Figure 4:
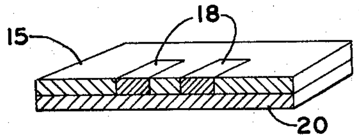
FIGURE 4 is a view in perspective of a portion of the assembled and bonded pole piece assembly, in cross section on a line A—A, through the laminae of FIGURE 3 after assembly.

FIGURE 4 represents a portion of an assembled pole piece according to the invention shown in perspective and in cross-section along a line A—A of FIGURE 3 after assembling. Pole pieces 18, matrix sheet 15 and base sheet 20 are firmly bonded together, forming a laminate in which the pole pieces 18 are inlaid into the upper lamina.

Figure 5:
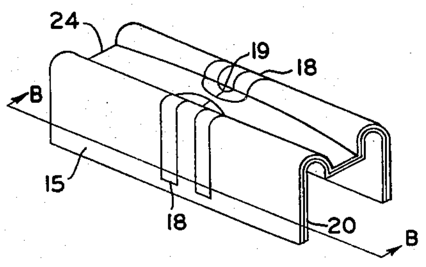
FIGURE 5 is a perspective view of an assembled marquetry pole piece portion of a transducer head according to the invention, after forming into a configuration for use with strip record means.

FIGURE 5 shows an embodiment of the pole piece assembly of the invention, formed into configuration suitable for use in a magnetic tape recording or playback unit. The pole piece is formed into a shape which provides for a tape path 24, with pole pieces 18 positioned in the tape path in such a way that gaps 19 are in exact alignment, and are positioned exactly at right angles to the longitudinal axis of the tape.

Figure 6:
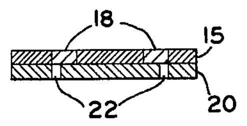
FIGURE 6 is cross-sectional view on line B—B, of FIGURE 5, of the assembled and formed pole piece, matrix and base sheet laminate.

FIGURE 6 is a cross sectional view on line B—B of FIGURE 5, showing pole pieces 18 inlaid into the matrix sheet 15 and firmly bonded to base sheet 20, and showing openings providing for access to the reverse side of pole pieces 18, so that magnetic contact can be made therewith for completing the magnetic circuit.

Figure 7:
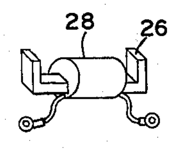
FIGURE 7 is a view in perspective of a pickup coil and core assembly adapted for completing the transducer heads.

FIGURE 7 shows, in perspective, an element suitable for completing the transducer, and consisting of a core 26 of magnetic material, on which is wound an electrical coil 28, provided with suitable leads for making connections to the other components of an electronic circuit.

Figure 8:
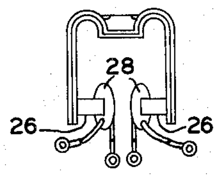
FIGURE 8 is a view showing two coil and core assemblies of FIGURE 7 used to complete a transducer head using the pole piece assembly of FIGURE 5.

FIGURE 8 shows 2 coil assemblies of the type depicted in FIGURE 7, in position in a head of the type shown in FIGURE 5. The upstanding legs of the core 26 extend through apertures 22 in base sheet 20 (FIGURE 6), to complete the magnetic circuit.

Figure 9:
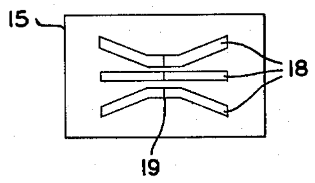
FIGURE 9 is a plan view of another embodiment of the marquetry pole pieces of the invention.

FIGURE 9 is a plan view of another embodiment of the invention, in which matrix sheet 15 is provided with cut out portions to accommodate pole pieces 18, here shown inlaid into the matrix sheet, each having a gap 19, and all three gaps being aligned. The matrix and pole pieces are supported by and firmly bonded to a base sheet, which is not visible in this view. After shaping and addition of the necessary coil and core assemblies, such a head is useful for recording or playback of information recorded magnetically upon a strip of tape, in three channels.

Figure 10:
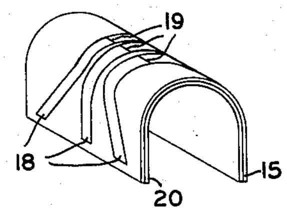
FIGURE 10 is a perspective view of the sheet shown in FIGURE 9, formed into a suitable form for use in a transducer head.

FIGURE 10 shows, in perspective, the flat laminate of FIGURE 9 after forming into a configuration suitable for use in a transducer head. It will be seen that the forming operation does not disturb the predetermined alignment of gaps 19, nor does it alter the dimensions of the gap.

Figure 11:
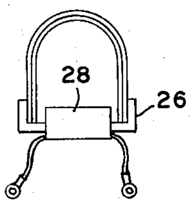
FIGURE 11 is a side view of a completed transducer, using the pole piece assembly of FIGURE 10.

FIGURE 11 shows a completed head using the pole piece assembly depicted in FIGURE 10, with the upstanding portions of the magnetic core 26 of an electrical coil assembly such as that shown in FIGURE 7 contacting pole pieces 18 and completing the magnetic circuit.

In the process of manufacture of transducer heads according to the invention, the openings in the Inconel matrix sheet 15 and the mumetal pole pieces 18 are cut from the sheet metal, the pairs of pole pieces being cut out as a single piece, and later cut apart at the point where the gap is to be formed. Sheets of Inconel and mumetal held in position by clamps or a suitable jig (not shown) can, for example, be sawed out using a fine saw blade (such as a jeweler's saw) inclined to the plane of the pieces as in marquetry working to provide accurate mating of the inlays into the matrix as shown in FIGURE 5. Alternatively a large number of matrix openings or pole-piece blanks can be cut at one time from an assembly of sheets of the correct metal in a stack held together by suitable clamping means.

Stamping-out of the openings and pole pieces, using dies, may also be resorted to where the requirements for dimensional tolerances are rather larger than those obtainable by individual sawing or cutting operation. However, where extremely close tolerances and small dimensions are required an electron beam milling machine is used to provide highly accurate matrices and inlays.

It will be understood that it is not necessary that the matrix fit the inlay over the entire area of the latter. It is only critical that the matrix provide an exact fit to the inlay at the gap and for a sufficient distance along the sides of the pole pieces adjacent to the gap so that alignment and gap dimensions and positions are controlled to predetermined values.

A method which is particularly convenient and suitable for use in producing the pole pieces and matching matrices is the photo-etching process. In this procedure the burring of the edges which is caused by stamping out using cutting dies is eliminated. The general procedure is well-known and essentially it consists of successive steps as follows: A sheet of metal of suitable size is coated with a photosensitive layer and exposed imagewise to light such that the portion to be retained is lighted and the portion to be removed is dark. The photosensitive layer is then developed by a suitable method adapted to the type of photosensitive layer used, to render the exposed parts insoluble, and the unexposed portion is washed away. The reverse of the sheet and edges are then protected by application of a suitable coating, a resist, and the sheet is subjected to attack by a chemical agent, for example, an acid which dissolves away the metal where the photosensitive layer was not exposed to light and hence was removed. The hardened exposed portion serves as a protective coating for the desired shape. After the unwanted metal is etched away, the resist and hardened protective layer are removed from the sheet by washing in a more powerful solvent, rinsed thoroughly and dried.

To facilitate later forming operations, it is more convenient to use sheet metal which is not too hard and when different grades are available the softer metal is selected. It is of course possible to use sheets of somewhat different thickness if desired. If the matrix sheet is the thicker, it is machined after shaping of the pole piece assembly, so that the portion contacted by the magnetic record member is no thicker than the pole pieces at the gap, so as to provide a perfect contact of head and record medium.

The pole pieces 18 are conveniently prepared in one piece with both legs joined at the point where the gap is to be formed by any of the above procedures. These blanks are then accurately cut apart most usefully at exactly right angles to their longitudinal axis, and generally at a point exactly midway between the ends of the legs. This is best effected by use of a guillotine-type cutting instrument (not shown) cutting against a hard base to avoid turning the edge. To effect accurate mating of parts it is preferred that the two matching legs are identified by some means such as printed or etched indicia so that they are subsequently reassembled in the same relationship as before cutting. It is also advantageous when the guillotine creates a slightly V-shaped or beveled edge to the severed pieces to reassemble them so that the point of the edge (the bottom side when cut) is at the side of the head which contacts the magnetic tape since there is a slightly enhanced magnetic field under such conditions.

The severed U-shaped pieces, now four J-shaped pieces, are then electroplated. For this purpose, rhodium has been found to be particularly desirable. This is accomplished by known means and hence need not be more fully discussed. A very thin coating about 0.5 micron thick is preferred. It has been found that the rhodium plating can ensure that a one-micron gap is accurately produced and is far better in this regard than other metals. So far as can be determined, this may be due to a much lower tendency to form thicker deposits at the edges, the so-called edge effect. The rhodium plating serves to protect the mumetal from wear due to passage of the tape and somewhat facilitates adhesion as hereinafter described. Alternatively, the pole pieces can be vapor-coated with rhodium or other suitable metals. The base sheet 20, matrix 15 and pole pieces 18 are now assembled to form a flat head-blank. The matrix sheet 15 is positioned on the Inconel base lamina 20 and the four J-shaped, rhodium-plated mumetal pole pieces 18 are fitted into cut-out portions 16 in the Inconel matrix sheet 15, gaps 19 being formed at their juncture. In order to form an integrally bonded piece as shown in FIGURE 4, the pieces are first temporarily spot-welded together very lightly and then finally welded together as will be presently described. Since it is not desirable to change the surfaces or contour of the sheets during welding nor to contaminate them with metal from the welding, it is preferable to spot-weld the assembly electrically under uniform pressure and short welding time so that there is not time for the heat to pass from the welding interface to the electrodes. The welding pressure can be quite strong so long as it is uniformly distributed; for example, by the use of self-aligning shoes on the welding electrodes.

In one embodiment of the invention, a base sheet 20, 4 mils thick and a matrix 15, 2 mils thick, are prepared from Inconel, each sheet being approximately 1 inch by ¾ inch. The two U-shaped openings in the matrix sheet are spaced 25 mils apart at the apices, the width of the pole openings being about 93.75 mils and the whole U-shaped opening being 240 mils wide overall and 363 mils long from the open end to the apex. The U-shaped pole piece inlays are made to fit the holes as closely as possible. It will be evident that if there is slight undercutting during the etching operation it may be advantageous to make the pole piece inlay just slightly larger than the opening in the matrix sheet so that more accurate fit is possible. For example the legs of the U may be 242 mils wide outside, 96 mils wide in each leg and the U may be made 365 mils high. The pole piece inlays are 2 mils in thickness; and they are rhodium plated as described above.

The base sheet 20 may have apertures 22 as shown, if it is desired to provide access to the legs of the pole pieces for use in completing the magnetic circuit when the winding is added to complete the transducer.

The mating pole pieces 18 in the U-shaped cavities 16 are pressed against each other so that the gap 19 consists virtually only of the thickness of the rhodium plating of the two pieces at this place, i.e. there is about 1 micron distance between the mumetal edges of the mating pole pieces. When the pole pieces have been accurately and carefully positioned they are also spot welded in place as above. The whole assembly is then held together by spot welds which are conveniently about ⅛ inch apart.

The final bonding of the laminae of the flat pole piece assembly after spot welding of the Inconel matrix 15 and mumetal inlays 18 to the base sheet 20 is carried out by making the weld between the laminae practically continuous.

This strengthens the flat laminate and it becomes substantially an integral unit which can be formed into any desired shape. To accomplish the welding, the spot welded assembly is passed between hard tellurium copper welding rollers which are geared to revolve together and provide a moderate pressure on the laminate. Pulses of electricity are passed between the rollers, using a thyratron welder and an interrupter giving about 150 half-cycle pulses per minute. In this way the base sheet 20, matrix 15 and inlays 18 are welded together without damage at successive, substantially adjacent lines lengthwise of the rollers. This method of welding is well-known and the process as used herein is conventional. After welding, the laminated pole-piece assembly is ready for the forming operation. While electro welding has been specifically described as the means for bonding the laminate, it will be seen that other methods, such as the use of thermoplastic resins, are also suitable.

It will be apparent that the flat pole-piece containing sheet can be formed to any desired configuration by sheet metal forming techniques. The particular embodiment in which U-shaped complementary poles are used is especially useful for producing a configuration of the type shown in FIGURE 5. In forming this type of head, the actual shaping best takes place in two steps. First, the laminate is bent into a U-shaped arcuate form, the sides being 0.3125 inch apart and parallel with the rounded mid portion, which has an outside radius of 0.1563 inch. The arcuate blank is then placed in a female die having the appropriate configuration and centered using a retaining plate which is carefully applied and tightened so that the arcuate blank is accurately centered and held in position. A male die of complementary configuration is used. However, it has been found that the first forming step is more usefully done using a rubber male die of the same form as the steel die particularly where relatively hard metal is used in the pole piece assembly. The rubber die need not be quite as accurately dimensioned as the steel die since it is not the final forming die and is used to facilitate forming of the arcuate blank to the approximate shape of the female die with less strains than may be introduced by immediate use of the steel male die. The surface of the die is provided with two parallel convex ridges 0.085″ in diameter which mate with the grooves of the female die and are 0.207″ on centers. The median groove of the male die is 0.122 inch wide and convex on a radius of curvature of 1.5 inches. These dimensions are used for both dies.

In practice, the rubber male die is pressed into place and then struck sharp blows with a hammer. This serves the effect a considerable conformation to the shape of the female die. The rubber male die is then withdrawn and the steel male die introduced and final shaping is carried out by pressing the dies together in an hydraulic press. FIGURE 5 shows the formed head in which 18 designates the actual magnetic mumetal pole pieces and the convex shape of the base of the magnetic tape guiding groove 24 is visible.

After forming, the pole piece assembly is placed in an oven and annealed in a dry inert gas such as helium for one hour at 1150° C. and then allowed to cool at a rate of about 200° to 250° C. per hour in the gas until cooled to about 50° C. It is then removed and is ready for application of suitable coils to produce a complete transducer which is suitable for use in systems for recording playback or erasure of magnetically recorded information. Mumetal welded to Inconel and annealed with it in this way has magnetic properties equally as good as when it is annealed alone, showing that no appreciable stresses have developed in it.

The openings 22 in base plate 20 through which the magnetic circuit is established are shown in cross-section in FIGURE 8. In FIGURE 8 the combined core 26 and coil winding 28, (FIGURE 7) are shown combined with the formed pole piece shown in FIGURE 5. The result is a very useful, lightweight transducer, which is readily encapsulated in a synthetic resin if desired.

Although the production of laminated pole pieces of the invention has been described with particular reference to a dual in-line head, it will be apparent that the invention can be readily adapted to the construction of transducers having numerous other desired combinations such as single, triple or even quadruple sets of poles which can be in line, or if desired staggered in any predetermined sequence.

A pole-piece assembly for a three-track head is shown in FIGURES 10 and 11. Other configurations or combinations are easily achieved and their construction will be readily apparent to those skilled in the art.

What is claimed is:

A pole piece assembly for magnetic transducers, comprising, in combination, a thin, flat non-magnetic base sheet, a thin, flat non-magnetic matrix sheet superimposed on said base sheet and substantially coextensive therewith, and having an opening therein in the shape of at least one pair of magnetic pole pieces, thin, flat magnetic sheet pole pieces abutting at edges thereof to form a magnetic gap in the plane of said matrix sheet positioned in said opening in said matrix sheet in accurate predetermined location and with predetermined alignment of the magnetic gap of said pair of pole pieces; said pole pieces being shaped to fit closely within said opening and being supported therein by said base sheet; and said base sheet, matrix sheet and pole pieces being integrally united over substantially all abutting surfaces thereof, whereby said pole piece assembly is deformable to three-dimensional shape without loss of predetermined gap alignment.

References Cited by the Examiner

UNITED STATES PATENTS

| | | | |
|---|---|---|---|
| 723,518 | 3/03 | Ellison | 317—201 X |
| 2,662,120 | 12/53 | Anderson | 179—100.2 |
| 2,717,928 | 9/55 | Nordyke | 179—100.2 |
| 2,806,704 | 9/57 | Burdett | 29—155.6 X |
| 2,902,544 | 9/59 | Barry | 179—100.2 |
| 2,908,770 | 10/59 | Warren | 179—100.2 |
| 2,915,812 | 12/59 | Rettinger | 29—155.59 |
| 2,943,384 | 7/60 | Wisner | 29—155.59 |
| 2,962,637 | 11/60 | Janicke | 317—203 |
| 3,049,790 | 8/62 | Camras | 29—155.5 |

LARAMIE E. ASKIN, *Primary Examiner.*

SAMUEL BERNSTEIN, JOHN F. BURNS, *Examiners.*